United States Patent [19]

Smith et al.

[11] Patent Number: 5,226,681
[45] Date of Patent: Jul. 13, 1993

[54] OUTLET CONNECTION ASSEMBLY

[75] Inventors: William H. Smith, Baltimore; Robert E. Cates, Arnold, both of Md.

[73] Assignee: Baltimore Aircoil Company, Jessup, Md.

[21] Appl. No.: 738,682

[22] Filed: Jul. 31, 1991

[51] Int. Cl.⁵ .............................................. F16L 5/00
[52] U.S. Cl. ..................... 285/200; 285/55; 285/205
[58] Field of Search .................. 285/55, 200, 205; 29/428

[56] References Cited

U.S. PATENT DOCUMENTS

| 2,336,885 | 12/1943 | Pepersack | 285/200 X |
| 2,441,009 | 5/1948 | Cunningham | 285/200 |
| 5,046,762 | 9/1981 | Konishi | 285/200 X |

FOREIGN PATENT DOCUMENTS 150132  5/1951  Australia ............................. 285/200

Primary Examiner—Dave W. Arola
Attorney, Agent, or Firm—Edward J. Brosius; F. S. Gregorczyk; Thomas J. Schab

[57] ABSTRACT

The present invention provides an outlet connection for use in a lined basin. A structural steel basin, usually part of a cooling tower, includes a fiberglass reinforced polyester liner. Such liner is desired to provide corrosion resistance and watertightness to the steel basin. The outlet connection includes a piping section of cylindrical shape affixed to a backing plate. The piping section passes through an opening in the liner, with the backing section and another backing plate holding gaskets compressed against the liner. The piping section extends through an opening in a basin wall section, and a closure plate is affixed to the basin wall section. The closure plate also has an opening corresponding to the outer surface of the piping section, and is held to the piping section along the sides of said opening by welding or other similar means.

8 Claims, 2 Drawing Sheets

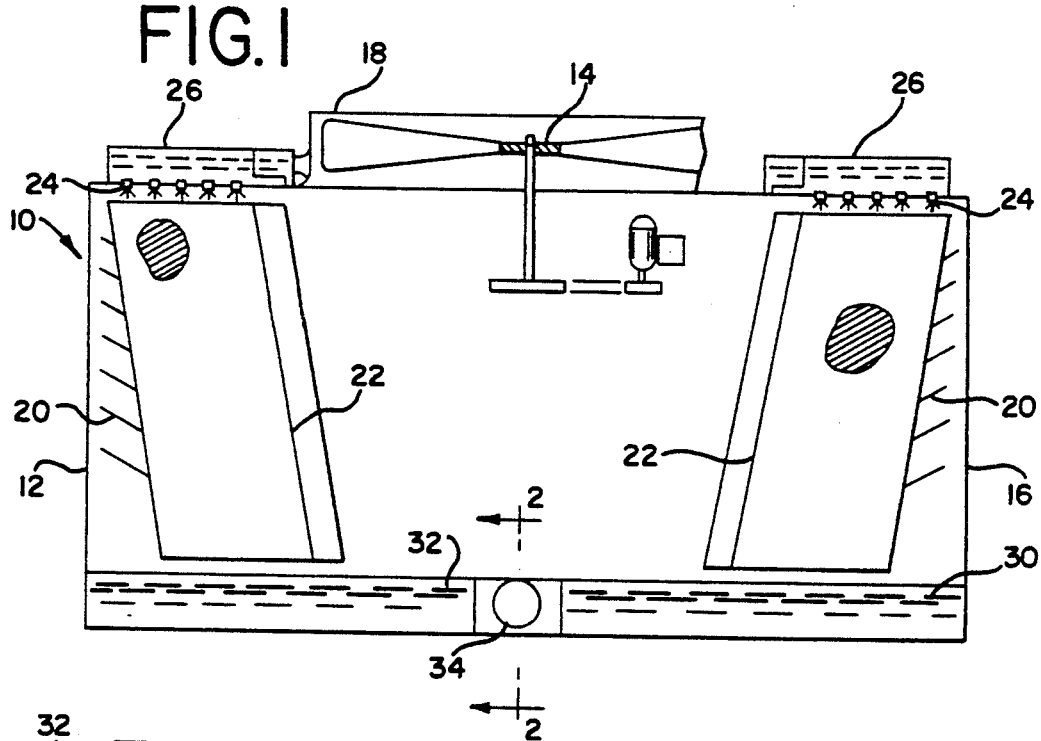
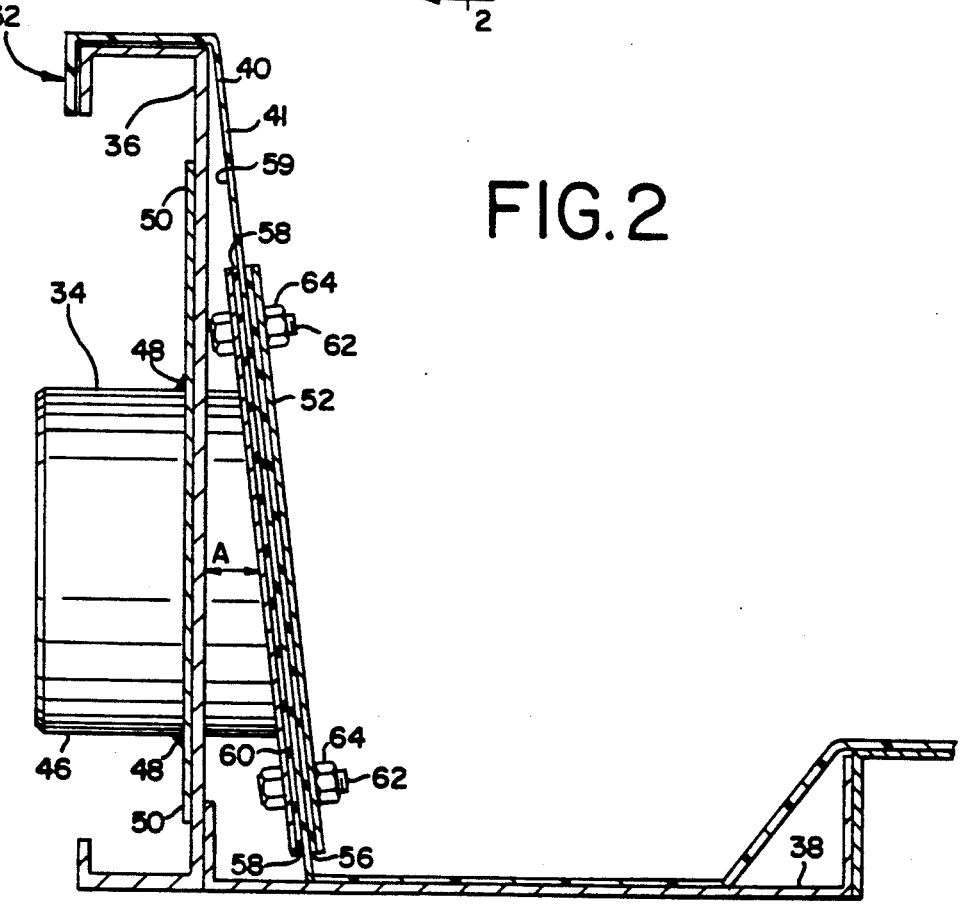

OUTLET CONNECTION ASSEMBLY

BACKGROUND OF THE INVENTION

This invention relates generally to piping connections, and, more specifically, to an outlet piping connection assembly having substantial application in the area of evaporative water cooling towers.

Evaporative water cooling towers are well known in the art. These towers have been used for many years to reject heat to the atmosphere. Evaporative water cooling towers may be of many different types including counterflow forced draft, counterflow induced draft, crossflow forced draft, crossflow induced draft, hyperbolic, among others.

Evaporative water cooling towers are used in a variety of applications. For example, such towers are used to provide cooling water to industrial processes such as food processing operations, paper mills, and chemical production facilities. A very large area of application for cooling towers is the area of comfort cooling, or air conditioning systems. In these systems, evaporative cooling equipment is utilized to provide cooling water needed in the condensing operations of the refrigeration system.

Crossflow type evaporative cooling towers could be utilized in either comfort cooling or industrial cooling applications. Crossflow cooling towers typically include a heat transfer surface often comprising a plurality of fill sheets grouped together and supported by the tower structure. Water is distributed from a distribution system gravitationally downwardly through the fill sheets, spreading out across the fill sheets to maximize the water's surface area. As water flows down the fill sheets, air is drawn across, or blown through, the fill sheets in a direction that is 90° transposed from the direction of water flow. As the air contacts the water, heat and mass transfer occur simultaneously, resulting in a portion of the water being evaporated into the air. The energy required to evaporate the water is supplied from the sensible heat of the water which is not evaporated. Accordingly, the temperature of the nonevaporated water remaining in the tower is reduced and cooling is accomplished. The cooled water remaining in the tower is typically collected in a cooled water sump which is generally located at the bottom of the tower structure. From this collection sump, the water is pumped back to the heat source where it picks up additional waste heat to be rejected to the atmosphere. The air into which the water is evaporated is exhausted from the tower.

For various reasons, including prevention of corrosion and leaking, it is desirable to line the cooled water sump with an impervious liner. Such liners could be comprised of various plastics or fiberglass reinforced polyester materials.

One problem which has been found with such lined basins is that it is difficult to connect outlet piping to the basin. Such outlet piping frequently is lengthy, heavy and may induce undesirable stresses on the liners.

SUMMARY OF THE INVENTION

It is an object of the present invention to provide an outlet connection assembly adapted to provide a piping connection to a lined cooling tower basin.

In a lined basin, an opening is present both in the structural wall section of the cooling tower and in the liner itself. The connection assembly must provide a passage through both the wall section and the liner, yet insure that no undue stress is applied to the liner. It is also important that a watertight seal be formed such that liquid can pass from the lined basin through the connection assembly to the outlet piping.

The connection assembly of the present invention includes an outlet device comprising a generally cylindrical or other desired cross section elongated piping or conduit portion affixed to a generally planar backing section. The conduit portion extends through an opening in a plastic liner material in the cooling tower basin and through an opening in the structured wall of the basin. Gaskets are provided on both sides of the liner, one held against the inner side of the liner by the backing section of the outlet device and the other held against the outer side of the liner by a backing plate. Such gaskets aid in distributing the compression load on the liner. The backing plate is held by attachment devices such as bolts that pass through openings in the backing plate, the first gasket, the liner, the second gasket and the backing section. A tight fit is desired to assure that liquids from inside the lined basin can exit through the conduit portion of the outlet device to an attached pipe without leaking.

The outer surface of the conduit portion of the outlet device is affixed, usually by a continuous weld, to a closure plate. The closure plate itself is attached to an outer surface of the structural wall of the basin, usually by metal screws. The welding of the closure plate to the conduit portion of the outlet device assures that any structural loading or stress applied to the conduit portion of the outlet device by any piping attached thereto will be supported by the closure plate and the structural wall of the basin. The plastic liner will not be subjected to such loading nor potential damage from movement associated with such loading.

BRIEF DESCRIPTION OF THE DRAWINGS

In the drawings,

FIG. 1 is a front view in partial cross section of a cooling tower employing the connection assembly of the present invention;

FIG. 2 is a side view in partial cross section of an embodiment of the connection assembly of the present invention.

DETAILED DESCRIPTION

Figure 3:
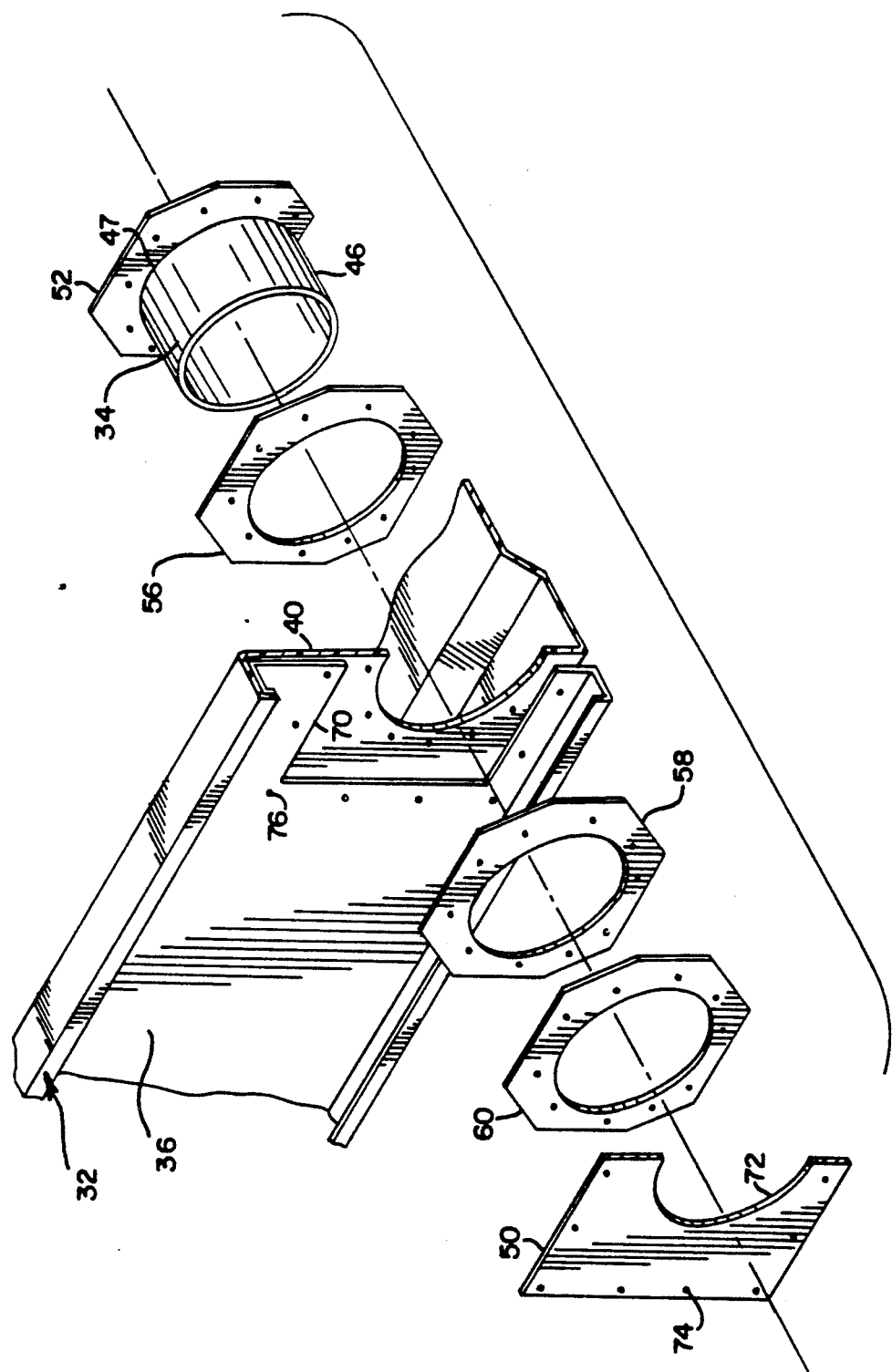
FIG. 3 is an exploded view in partial cross section of the components of an embodiment of the connection assembly of the present invention.

Referring now to FIG. 1 of the drawings, a typical cross flow cooling tower is shown generally at 10. Air is drawn by fan 14 inwardly from sides 12 and 16 and out top plenum 18. Liquid to be directly cooled is pumped upwardly into top distribution troughs 26. The liquid exits distribution basin 26 from a plurality of spray nozzles 24. The liquid is sprayed downwardly over a plurality of fill sheets 22, which are arranged in a spaced assembly with fill sheets 22 forming spaces therebetween parallel to each other and running transverse to sides 12 and 16. This allows air to be readily drawn from outside sides 12 and 16 to pass through the openings between fill sheets 22 to directly cool much of and even evaporate some of the liquid cascading downwardly from spray nozzles 24 and running downwardly along fill sheets 22. Louver baffles 20 assure the limited run out of spray liquid beyond cooling tower 10.

Liquid sprayed downwardly over fill sheets 22 is cooled by air passing across fill sheets 22 and is collected at 30 in cooling tower basin 32. Cooled liquid 30 exits basin 32 through outlet 34, which is typically connected to piping that will carry the cooled liquid to the desired process use such as the evaporator or condenser of an air conditioning system.

It is desirable to line cooling tower basin 32 with various materials to assure corrosion resistance and watertightness of basin 32. Such linings can comprise various coatings, but recent developments have favored a fiberglass reinforced polyester liner material being supported along top edges of basin 32 and having its bottom flat against the structural bottom of basin 32.

Referring now to FIGS. 2 and 3 as well, basin 32 is comprised of metal wall 36 and base section 38. The metal of choice is steel, in a gauge thickness adequate to support the cooling tower and the liquid load in basin 32. All sections of basin 32 are not shown in detail, but it is readily understood that the metal sections are joined by usual methods such as welding or bolting, with the actual design and size of basin 32 not being of critical importance to the present invention.

Liner 40 is a plastic material that is affixed by form fitting or other desired means to the top section 42 of wall 36. Liner 40 extends downwardly and runs across the inside surface of bottom 38 of basin 32 to form a lined basin. Liner 40 is usually a plastic material of some structural integrity, with a fiberglass reinforced polyester or fiberglass reinforced vinylester being desirable embodiments. The liner material should be corrosion resistant, as the liquids run through cooling towers usually pick up various airborne materials that can have corrosive properties. It is also desirable that the liner material be watertight for obvious reasons as liner 40 serves as a collection sump for liquid 30 held in basin 32. Liner 40 is usually of a thickness of about one-quarter inch (6.3 mm). It is desirable to mount liner 40 in basin 32 such that most structural loading on liner 40 due to liquid 30 is absorbed and backed by the structural wall 36 and base 38 of basin 32.

Outlet 34 is comprised of components that are engineered to permit watertight flow of liquid 30 from within basin 32 to a pipe connected to outlet 34. Outlet 34 is also engineered to assure that any structural loading due to piping connected to outlet 34 is absorbed by structural wall 36 as opposed to liner 40.

Outlet 34 is comprised of a generally cylindrical piping section 46 that is affixed by means such as continuous welding along its back edge 47 to a generally planar backing section 52. Backing section 52 is joined to piping section 46 at an angle A that relates to the angle of liner 40 inside and relative to wall section 36. This angle A is typically 5° to 20°. As backing section 52 is transverse to piping section 46, the mounting angle between such sections can be said to be 70° to 85° from the vertical. Piping section 46 and backing section 52 of outlet 34 are usually constructed of thin wall steel, having a thickness of about one-eighth inch (3.1 mm). Such sections are usually galvanized for corrosion resistance, and could also be polymer coated if desired.

First gasket 56 is held between inside surface 41 of liner 40 and backing section 52. First gasket 56 is usually comprised of a neoprene or other rubber like material, and is usually about one-eighth inch (3.1 mm) thick. Of course, backing section 52, gasket 56 and liner 40 all have a cylindrical opening that corresponds to outlet 34 piping section 46. The external edge sloping of backing section 52 and gasket 56 is a design choice, but a square, rectangular or octagonal shape such as shown are acceptable.

Second gasket 58 is held against outside surface 59 of liner 40 by backing plate 60. Second gasket 58 is similar in material and thickness to gasket 56, and backing plate 60 is usually steel of about one-eighth inch (3.1 mm) thickness. Again, the outer edge shape of gasket 58 and backing plate 60 are design choices, but an octagonal shape as shown is acceptable. Gasket 58 and backing plate 60 each have a cylindrical opening corresponding to outlet 34 piping section 46.

A plurality of threaded bolts 62 and nuts 64 are each placed through aligned receiving openings in backing plate 60, gasket 58, liner 40, gasket 56 and backing section 52. Bolts 62 are tightened such that a watertight seal is formed against liner 40 by gaskets 56 and 58 by the compression of gaskets 56 and 58 by backing plate 60 toward backing section 52. Bolts 62 are preferably used with Woathon-Sorac type washers, or neophone-coated steel washers to effect a seal over the bolt hole.

Piping section 46 of outlet 34 also passes through a relatively large opening 70 in wall section 36. The reason for the large opening 70, usually square or rectangular in shape, is to assure access to bolts 62 from outside wall section 36. Closure plate 50 is usually square or rectangular in shape and is larger in dimension than opening 70. Closure plate 50 is affixed to wall section 36 by some type of threaded fastener such as sheet metal screws or threaded bolts that each pass through a plurality of aligned openings 74 in closure plate 50 and 76 in wall section 36.

Piping section 46 of outlet 34 passes through corresponding cylindrical opening 72 in closure plate 50. Further, once closure plate 50 is threaded in place against wall section 36, the outer surface of piping section 46 is welded, usually by intermittent tac welding, to the edge of opening 72. Such affixation of closure plate 50 to piping section 46 assures that any external loading applied to piping section 46, such as by the connection of external piping (not shown) to piping section 46, will not structurally affect liner 40. Rather, such loading will be transferred from piping section 46 to closure plate 50 and, in turn, to wall section 36.

What is claimed is:

1. A connection assembly comprising an outlet device including a pipe section and a backing section, said backing section having an opening therethrough, said pipe section having an end that is received through said backing section opening and is generally flush with said backing section, and means for retaining said pipe section in said opening, a wall section having an opening through which said pipe section of said outlet device passes, a closure plate having an opening through which said pipe section of said outlet device passes, first attachment means affixing said closure plate to an outer surface of said wall section, a liner inside said wall section, said liner having an opening through which said pipe section of said outlet device passes, a first gasket adjacent an outer surface of said liner and a second gasket adjacent an inner surface of said liner, said second gasket located between said inner surface of said liner and said backing section of said outlet device, a backing plate holding said first gasket against said outer surface of said liner and a plurality of second attachment means and a plurality of aligned separate openings in each of said backing plate, said first gasket, said liner, said second gasket and said backing section of said outlet device, with each of said second attachment means extending through said one of said plurality of openings to secure said backing plate with said backing section.

and securing means for securing said closure plate to said pipe section.

2. The connection assembly of claim 1 wherein said securing means is a weld between said closure plate and said pipe section of said outlet device to support said pipe section.

3. The connection assembly of claim 1 wherein said second attachment means are tightened to pull said backing plate toward said backing section of said outlet device such that said first and second gaskets seal against said liner.

4. The connection assembly of claim 1 such that said opening of said wall section is large enough such that upon removal of said closure plate, said plurality of second attachment means are readily accessible from outside of said wall section.

5. A method of providing an outlet connection from a lined tank having a wall section comprising the steps of:
  providing an outlet device including a pipe section and a backing section, with said pipe section extending through to a substantially flush position with said backing section, affixing said pipe section to said backing section, extending said pipe section through an opening in said liner and then through an opening in said wall section of said tank, providing a backing plate,
  providing a first gasket between said backing plate and said liner and a second gasket between said backing section of said outlet device and said liner,
  providing attachment means to affix said backing plate to said backing section of said outlet device,
  and providing a closure plate affixed to an outer surface of said wall section, said closure plate having an opening through which said pipe section of said outlet device passes.

6. The method of claim 5 further including the steps of affixing said closure plate about an outer surface of said pipe section of said outlet device.

7. The method of claim 5 further including the steps of tightening said attachment means such that said first and second gaskets seal against said liner.

8. An outlet connection comprising
  a liner means having an opening,
  a wall section having an opening,
  an outlet device including a generally cylindrical pipe section and a backing section, said backing section having an opening therethrough receiving said pipe section and means retaining said pipe section in said opening from which said pipe section extends,
  said pipe section of said outlet device extending through said opening in said liner means and said opening in said wall section,
  a first gasket adjacent an outer wall of said, liner and a backing plate adjacent said first gasket,
  a second gasket between an inner wall of said liner and said backing section of said outlet device,
  a closure plate and first attachment means affixing said closure plate to an outer surface of said wall section and second attachment means affixing said closure plate to an outer surface of said pipe section of said outlet device, and third attachment means affixing said backing plate to said backing section of said outlet device such that said first and second gaskets form a seal against said liner.

* * * * *